(12) United States Patent
Ajimi

(10) Patent No.: US 6,241,434 B1
(45) Date of Patent: Jun. 5, 2001

(54) DRILL, BIT, DRILL TOOL, AND MANUFACTURING METHOD OF DRILL BIT

(75) Inventor: Kunio Ajimi, Higashiosaka (JP)

(73) Assignee: House B.M. Co., Ltd., Osaka (JP)

( * ) Notice: Subject to any disclaimer, the term of this patent is extended or adjusted under 35 U.S.C. 154(b) by 0 days.

(21) Appl. No.: 09/324,165

(22) Filed: Jun. 2, 1999

(30) Foreign Application Priority Data

| Jul. 9, 1998 | (JP) | 10-194514 |
| Oct. 27, 1998 | (JP) | 10-305905 |
| Dec. 25, 1998 | (JP) | 10-370467 |
| Feb. 9, 1999 | (JP) | 11-031277 |

(51) Int. Cl.$^7$ ............................................. B23B 31/02
(52) U.S. Cl. ............................. 408/238; 279/75; 279/83; 408/226; 408/239 A; 408/239 R
(58) Field of Search .................................. 408/226, 240, 408/239 R, 238, 239 A; 279/14, 75, 83, 103

(56) References Cited

U.S. PATENT DOCUMENTS

| 318,986 | * | 6/1885 | Hicks . | |
| 1,264,370 | * | 4/1918 | Copeman | 402/226 |
| 2,087,814 | * | 7/1937 | Rawlings | 408/226 |
| 2,393,424 | * | 1/1946 | Selch | 408/226 |
| 2,918,954 | * | 12/1959 | Miller | 408/239 R |
| 3,534,640 | * | 10/1970 | Macy . | |
| 4,184,692 | * | 1/1980 | Benson et al. | 279/75 |
| 4,232,985 | * | 11/1980 | Nielsen | 408/226 |
| 4,573,839 | | 3/1986 | Finnegan | 408/239 |
| 4,850,758 | | 7/1989 | Morgan | 408/226 |
| 4,995,768 | * | 2/1991 | Craft | 408/239 A |
| 5,199,833 | * | 4/1993 | Fehrle et al. | 408/239 R |
| 5,470,180 | * | 11/1995 | Jore | 408/239 R |
| 5,542,797 | * | 8/1996 | Obermeier | 408/226 |
| 5,779,404 | * | 7/1998 | Jore | 408/239 R |
| 6,062,575 | * | 5/2000 | Mickel et al. | 279/95 |
| 6,089,798 | * | 7/2000 | Wierspecker et al. | 408/226 |

FOREIGN PATENT DOCUMENTS 5057553   3/1993   (JP) .

* cited by examiner

*Primary Examiner*—A. L. Wellington
*Assistant Examiner*—Monica Carter
(74) *Attorney, Agent, or Firm*—Smith Patent Office

(57) ABSTRACT

A drill bit and a manufacturing method thereof that ensures integral mounting of a drill and a drill holder with a simplified construction and in a simplified manner are disclosed. The drill bit has a drill with a bit and a shank, and a drill holder formed with an axial insertion hole for fitting the shank. An engaging part is formed at a base end of the drill. A blind hole that intersects the insertion hole is formed in the drill holder to form a restricting part, or a stopper equivalent to the restricting part is fitted in the bottom of the blind hole. Engagement of a top of the stopper or the restricting part with the engaging part prevents a relative rotation of the drill to the drill holder.

31 Claims, 14 Drawing Sheets

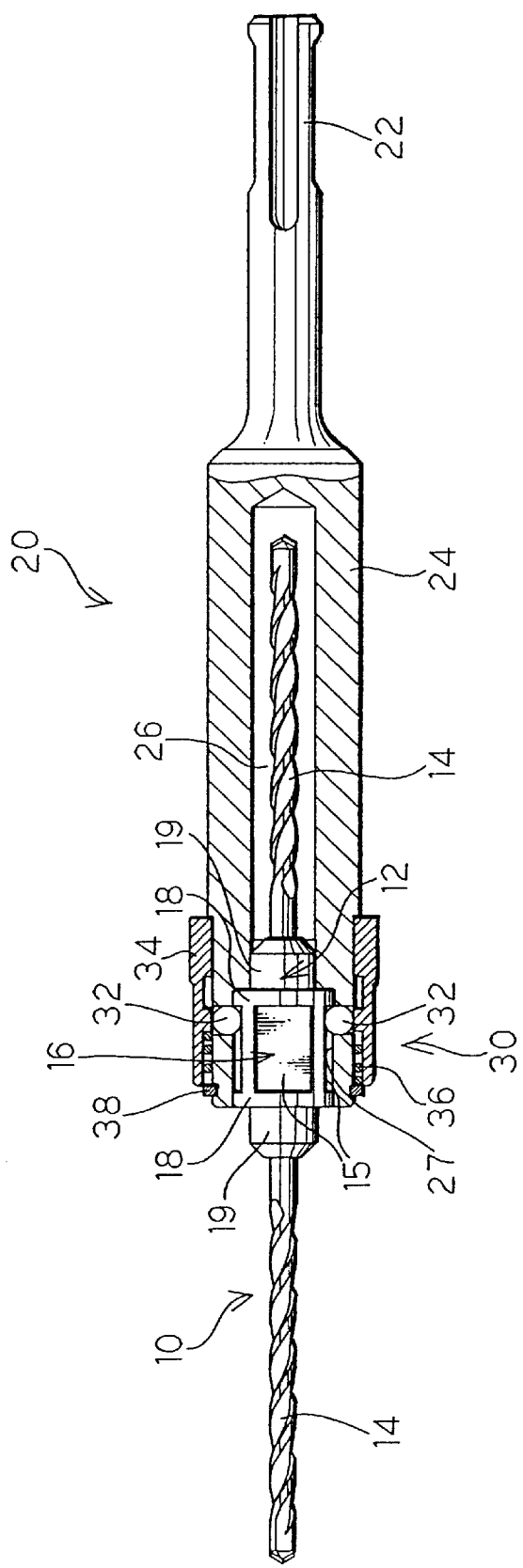

DRILL, BIT, DRILL TOOL, AND MANUFACTURING METHOD OF DRILL BIT

This application is based on Japanese patent applications, namely JP 10-194514, JP 10-305905, JP 10-370467, and JP 1131277 filed in Japan, the contents of which are incorporated hereinto by reference.

BACKGROUND OF THE INVENTION

1. Field of the Invention

This invention relates to a drill bit comprising a drill and a drill holder for holding the drill, a drill tool provided with the drill bit, and a manufacturing method of the drill bit.

2. Description of the Related Art

A drill bit is known, for instance as disclosed in Japanese Examined Patent Publication No. 8-18213/1996, comprising a drill part formed with a spiral bit on a circumference thereof and a holding part with a larger diameter than the drill part. The drill bit is drivingly rotated in a state that the holding part is held by, for instance, an electric drive source.

There has been a common practice, when manufacturing the drill bit, to shape the drill part and the holding part as one-piece unit by machining one metallic material with a lathe or the like.

However, the above machining process is cumbersome and requires a lot of processing, leading to a remarkable production cost rise.

As a means to solve the above problem, several drill bits have been proposed, as shown in FIGS. 16A to 16C. In any of these prior art drill bits, the drill bit comprises a drill corresponding to the drill part and a holder corresponding to the holding part and is constructed such that a shank formed at a base end of the drill is inserted into an insertion hole formed in the holder to joint the drill together with the holder. The specific construction of these drill bits is described one by one with reference to FIGS. 16A to 16C.

A drill bit 100 shown in FIG. 16A has a drill 200 including a main part 201 formed at a lead end thereof and a cylindrical shank 202 formed at a base end thereof. The drill main part 201 and the shank 202 are integrally formed. A spiral bit 203 is formed on the drill main part 201, and an external thread 204 is formed at an end of the shank 202.

The drill bit 100 has a holder 300 shaped into a cylinder with a larger diameter than the drill 200. A screw hole 301 is formed inside a lead end of the holder 300 concentrically with an axis of rotation of the drill 200. Screwing the external thread 204 of the shank 202 into the screw hole 301 enables mounting the drill 200 onto the holder 300.

The drill bit 101 shown in FIG. 16B is constructed by inserting a shank 202 into an insertion hole 311 formed in a holder 310 and adhering the joint part of the shank 202 and the insertion hole 311 with a brazing filler metal 312 including silver and nickel alloy, in place of providing the external thread 204 and the screw hole 301.

A drill bit 102 shown in FIG. 16C is constructed such that a flat part 204 is formed on an outer circumference of a shank 202, and a press fit hole (screw hole) 322 is formed extending from an outer circumference of a holder 320 toward a shank insertion hole 321 to communicate with the flat part 204. In this arrangement, inserting the shank 202 into the shank insertion hole 321 so as to set the flat part 204 in the press fit hole 322 and press fitting a metal piece 400 into the press fit hole 322 (or screwing an external thread 400 into the screw hole 322) enables preventing relative rotation of a drill 200 to the holder 320.

The drill bit 100 shown in FIG. 16A is constructed by screw joint of the drill 200 with the holder 300. Accordingly, the joint state may be loosened due to vibration during working with a result that the drill 200 unnecessarily vibrates in spite of holding of the holder 300 and in a worst case, the drill 200 may come out from the holder 300.

In the case of the drill bit 101 shown in FIG. 16B, if a large torque acts upon the drill bit 101 during working, adhesion of the joint part may be weakened, leading to breakage of the joint part. In such a case, the drill 200 may idly rotate relative to the holder 310 (namely, the torque is not transmitted to the drill 200), making the drill bit 101 usable. Particularly, filling of the filler 312 between the shank 202 and the insertion hole 311 is insufficient (poor filling state), even application of a small torque may break the joint part. This is not desirable when seeking for reliability of the drill bit.

The construction of the drill bit 102 shown in FIG. 16C also does not provide an effective solution to prevent relative rotation of the drill 200 to the holder 320 because there is a possibility that the metal piece (or external thread) 400 may be loosened and come out from the press fit hole (or the screw hole) 322 due to vibration and centrifugal force generated during working.

Other fixation means such as close fitting the shank 202 in the insertion hole 311 by shrinkage fit or press fit can be applied. However, such fixation by a close fit cannot sufficiently resist a large torque generated when start the drill bit starts rotating, and the problem that the drill rotates relative to the holder cannot be avoided.

SUMMARY OF THE INVENTION

In view of the aforementioned problems residing in the prior art, it is an object of the invention to provide a drill bit, a drill tool provided with the drill bit, and a drill bit manufacturing method that can securely prevent rotation of a drill relative to a drill holder with a simplified construction and in a simplified manner.

To solve the above problems, this invention adopts the following arrangements.

A drill bit, according to an aspect of this invention, comprises a drill including a bit and a shank, and a drill holder formed with an axial insertion hole to fit the shank. The shank is formed with an engaging part, the drill holder is formed with a hole with a closed bottom extending from an outer circumference thereof in such a way as to intersect the insertion hole, and a stopper is inserted in the bottom of the hole, whereby a top of the stopper engages the engaging part to restrict relative rotation of the drill to the drill holder.

In this arrangement, fittingly inserting the shank of the drill into the insertion hole of the drill holder to engage the engaging part of the shank with the top of the stopper inserted in the hole securely prevents relative rotation of the drill with respect to the drill holder. Accordingly, simply mounting the thus constructed drill holder onto a certain drive source for rotation secures integral rotation of the drill bit for drilling.

Further, the top of the stopper engages the engaging part of the shank in a state that the stopper is inserted in the bottom of the hole. In this arrangement, even if an external force such as vibration is exerted on the drill bit, the possibility that the stopper comes out from the hole is eliminated, and thus secures prevention of a relative rotation of the drill and the drill holder for a long span of time.

A drill bit, according to another aspect of this invention, comprises a drill including a bit and a shank, and a drill holder formed with an insertion hole to fit the shank. The drill holder is formed with a hole extending radially halfway through the insertion hole in such a way as to intersect a bottom end of the insertion hole to thereby form a restricting part at the bottom end of the insertion hole. The shank is formed with an engaging part at an end thereof to engage the restricting part. Thereby, an engagement of the restricting part and the engaging part restricts relative rotation of the drill with respect to the drill holder.

In this arrangement, fitting the shank of the drill into the insertion hole of the drill holder to engage the engaging part of the shank with the restricting part formed at the bottom end of the insertion hole securely prevents a relative rotation of the drill to the drill holder. Accordingly, simply mounting the thus constructed drill holder onto a certain drive source for rotation secures integral rotation of the drill bit for drilling.

Further, since the engaging part is integrally formed with the drill holder by forming the hole that intersects the bottom end of the insertion hole, the number of parts is reduced, and a step of press fitting a stopper pin, as having been performed conventionally, is not required.

A manufacturing method of a drill bit comprising a drill having a bit and a shank and a drill holder formed with an axial insertion hole to fit the shank, according to still another aspect of this invention, comprises the steps in the order named: forming an engaging part in the shank; forming a hole with a closed bottom extending from an outer circumference of the drill holder in such a way as to intersect the insertion hole; inserting a stopper in the bottom of the hole; and fitting the shank in the insertion hole to engage the engaging part with a top of the stopper.

In this method, performing the step of fitting the shank into the insertion hole to such a degree as to engage the top of the stopper with the engaging part after inserting the stopper in the hole securely prevents relative rotation of the drill with respect to the drill holder.

A manufacturing method of a drill bit comprising a drill having a bit and a shank and a drill holder formed with an insertion hole to fit the shank, according to yet another aspect of this invention, comprises the steps in the order named: forming a hole in the drill holder such that the hole radially extends halfway through the insertion hole and intersects a bottom end of the insertion hole to form a restricting part at the bottom end of the insertion hole; forming an engaging part at an end of the shank to engage the restricting part; and fitting the shank into the insertion hole to such a degree as to engage the engaging part with the restricting part to restrict relative rotation of the drill with respect to the drill holder.

In this method, performing the step of fitting the shank into the insertion hole so as to engage the engaging part with the restricting part after forming the restricting part at the bottom end of the insertion hole by the combination of the insertion restricting part and the hole securely prevents a relative rotation of the drill to the drill holder without increasing the number of parts.

These and other objects, features and advantages of the invention will become more apparent upon reading the following detailed description in conjunction with the accompanying drawings.

BRIEF DESCRIPTION OF THE DRAWINGS

FIG. 7 is a cross sectional front view showing an entire construction of a drill tool provided with the drill bit and a drill bit holder;

FIG. 8A is a cross sectional front view showing a locked state that mounting of the drill bit onto the drill bit holder. FIG. 8B being a cross sectional view taken along the line D—D in FIG. 8A;

FIG. 9A is a cross sectional front view showing a released state of the drill bit onto the drill bit holder. FIG. 9B is a cross sectional view taken along the line E—E in FIG. 9A.

DETAILED DESCRIPTION OF THE INVENTION

Figure 1:
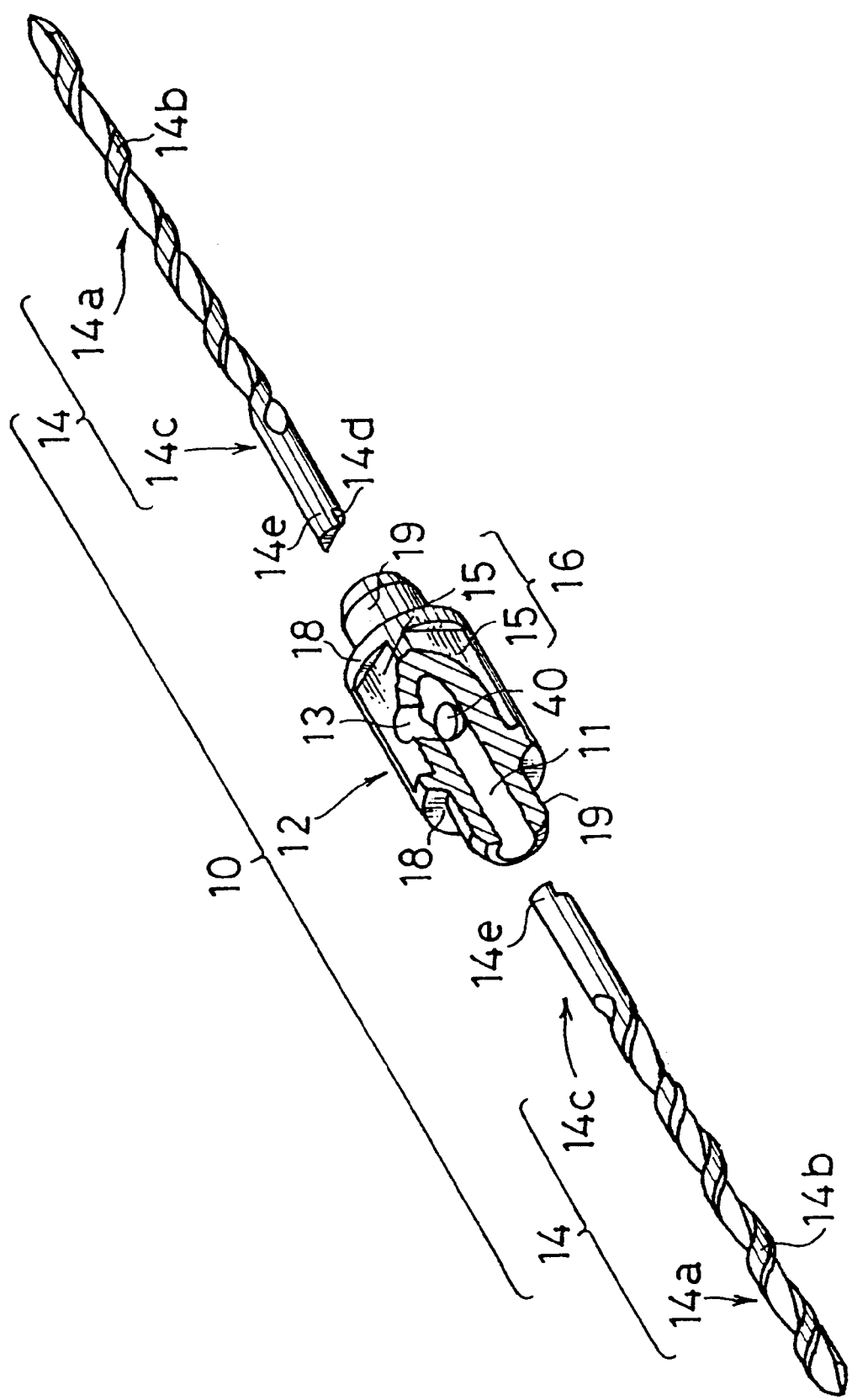
FIG. 1 is a partially cutaway exploded perspective view of a first embodiment of a drill bit according to this invention.
Figure 2:
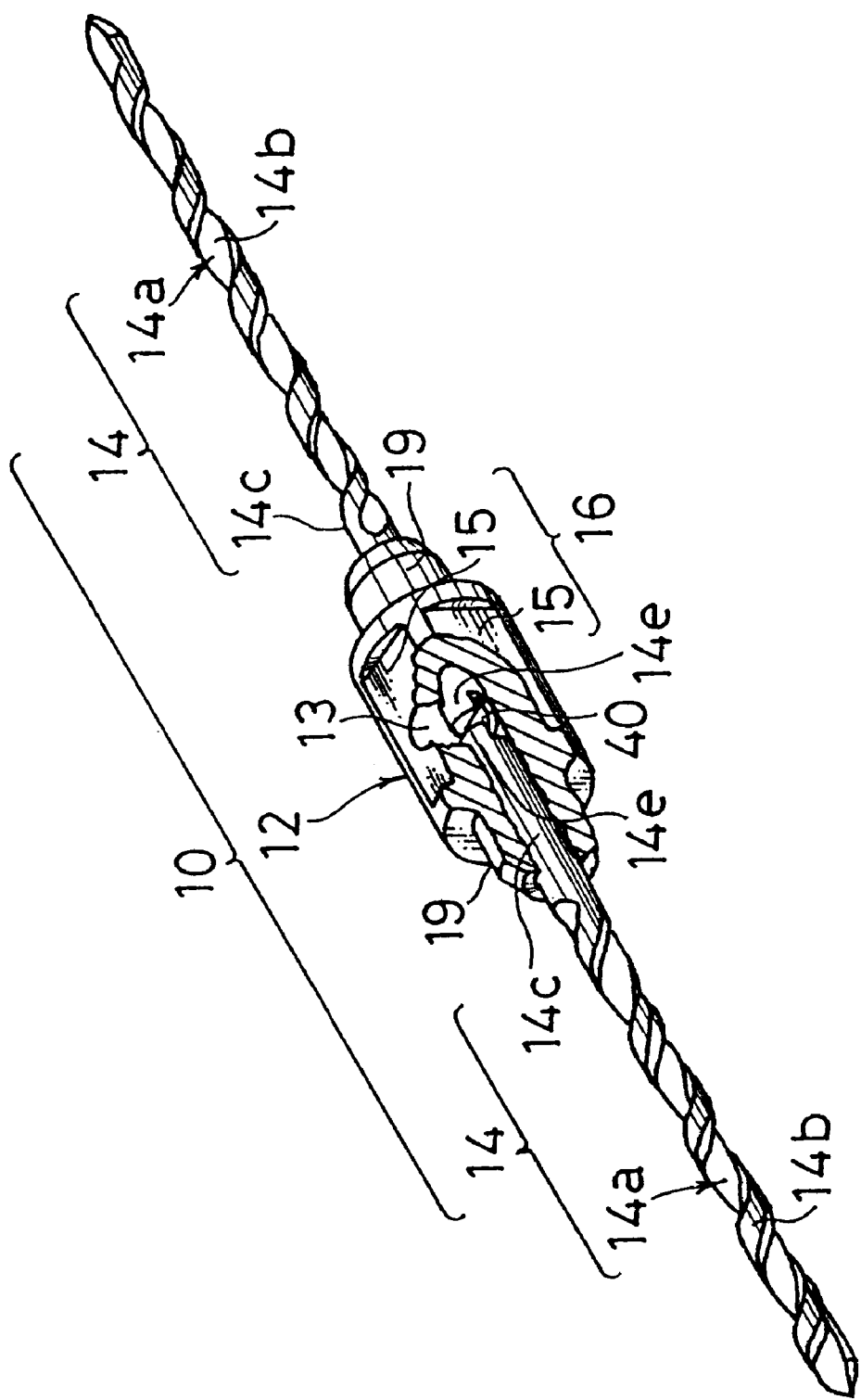
FIG. 2 is a partially cutaway perspective view showing an assembled state of the drill bit.
Figure 3:
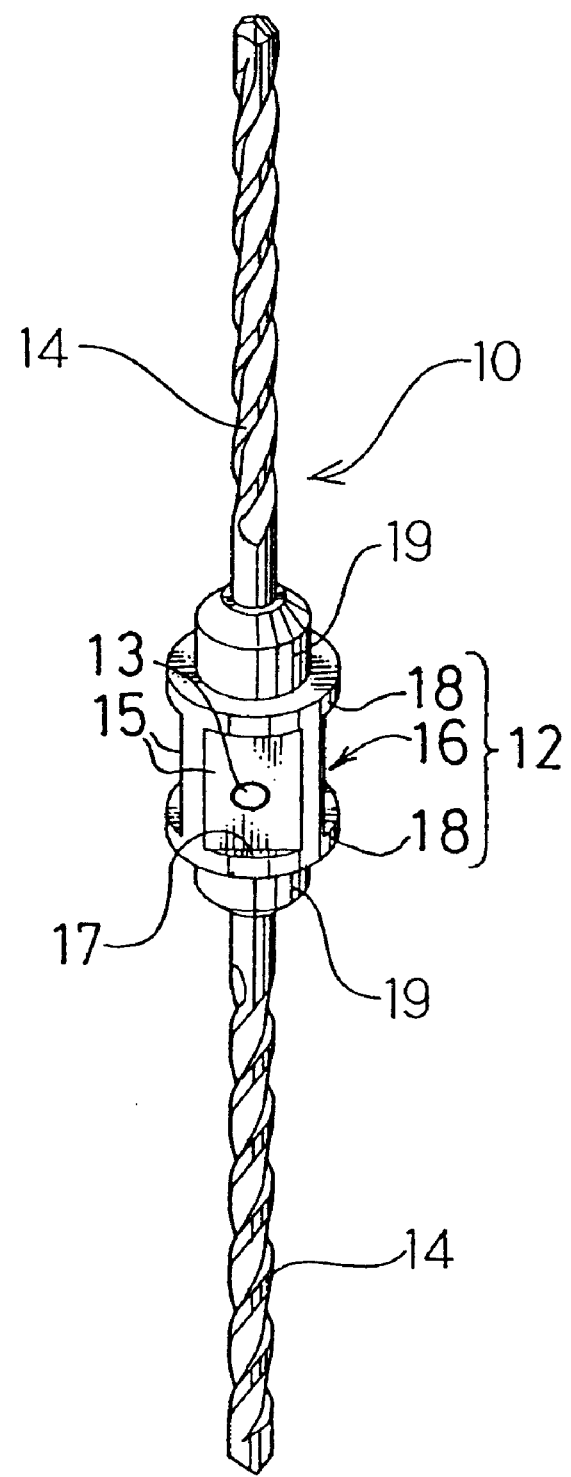
FIG. 3 is a perspective view showing the assembled state of the drill bit in upright posture.

A first embodiment of this Preferred Embodiment is described with reference to FIGS. 1 to 9B.

A drill bit 10 in this embodiment includes a drill holder 12 and a pair of drills 14 connected to opposite ends of the drill holder 12 respectively.

An outer shape of the drill holder 12 is described. The drill holder 12 includes a pair of disk parts 18 formed at axially opposite ends thereof identical in shape with each other and having a diameter larger than the drill 14, and an intermediate part 16 formed between the disk parts 18. The intermediate part 16 has a non-circular cylindrical shape with a substantially square shape in cross section. The non-circular part 16 is formed by slicing off four parts, from a cylinder, over a circumference of the cylinder in such a manner as to leave four flat planes 15. In this embodiment, four corner ends of the non-circular part 16 in cross section has a circular arc shape and are continued to the disk parts 18. In other words, the drill holder 12 has a combined configuration of a cylinder and a and prism such that a circular cylinder is sliced off to leave the plane 15 at a plurality of positions over the circumference of the intermediate part while also leaving the axially opposite ends (disk parts 18) thereof.

A cylindrical centering shaft 19 is formed between the drill holder 12 and the corresponding drill 14 with a diameter larger than the drill 14 and smaller than the disk part 18.

An internal construction of the drill holder 12 is described below: The drill holder 12 is formed with an insertion hole 11 extending along an axis of rotation thereof and passing therethrough, and a hole 13 with a closed bottom (hereinafter also referred to as "a blind hole") which extends from a center of one of the four flat planes 15 radially inwardly to intersect the insertion hole 11. Note that the term "blind hole" is meant to be a hole with a bottom closed as opposed to a through hole that has an open bottom.

Figure 4:
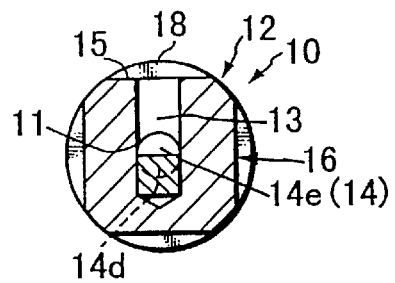
FIG. 4 is a cross section taken along the line A—A in an FIG. 5.
Figure 5:
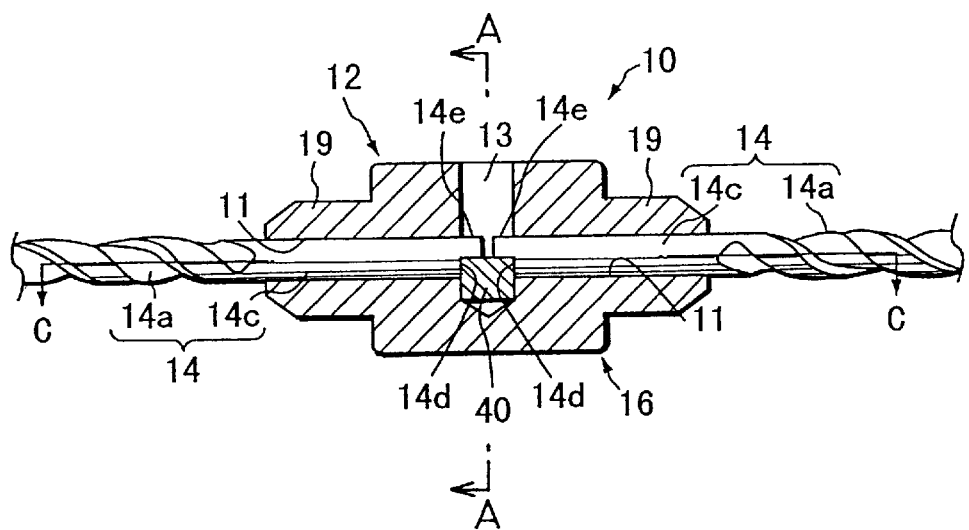
FIG. 5 is a cross sectional front view of the drill bit.
Figure 6:
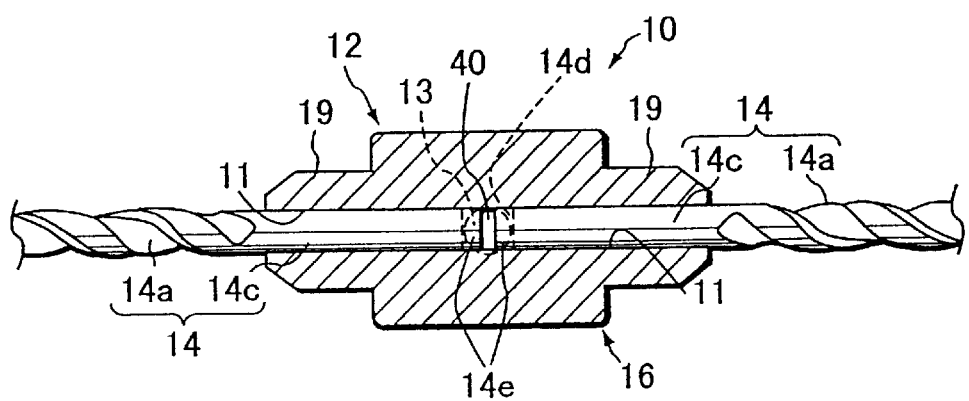
FIG. 6 is a cross section taken along the line C—C in FIG. 5.

A cylindrical stopper 40, for instance, a metal piece is inserted (press fit in this embodiment) into the bottom of the blind hole 13. The outer diameter of the stopper 40 is the same or slightly larger than the inner diameter of the blind hole 13, as shown in FIGS. 4 and 5. The stopper 40 is press fitted by hammering down the stopper 40 with a tool such as a hammer and a punch. Fixing the stopper 40 on the bottom of the blind hole 13 in this way prevents the stopper 40 from coming out and facilitates the fitting operation of the drills 14 which is described below.

Insertion of the stopper 40 can be done by other ways than by being press fit. A clearance fit of the stopper 40 such that the stopper 40 can fit in the blind hole 13 with a clearance may also enable assembling of the drill 14.

The diameter of the stopper 40 and the blind hole 13 may be smaller than the insertion hole 11. However, setting the diameter of the stopper 40 and the blind hole 13 larger than the insertion hole 11 (equivalent to the diameter of the insertion hole 11 in FIG. 4) prevents the stopper 40 from falling from the insertion hole 11 during an assembly process and facilitates the assembling.

The height of the stopper 40 (vertical dimension in FIG. 5) is set such that about half of a top thereof protrudes inside the insertion hole 11 when the stopper 40 is press fit into the bottom of the blind hole 13.

The drill 14 is integrally formed with a drill main part 14a formed with a spiral bit 14b and a cylindrical shank 14c. The outer diameter of the shank 14c is set the same or slightly larger than the inner diameter of the insertion hole 11 and the length thereof is set slightly longer than half of the length of the insertion hole 11.

A tongue-like engaging part 14e protruding in the axial direction of the drill 14 is formed at a distal end 14d of a base end of the shank 14c. The engaging part 14e is formed by cutting out the base end of the shank 14c radially halfway. Fitting the shank 14c into the insertion hole 11 allows the distal end 14d of the shank 14c to abut against an outer circumference of the stopper 40 while positioning the engaging part 14e on the top of the stopper 40 (namely to cover the top of the stopper 40 from the opposite side of the bottom of the blind hole 13).

In this state, the engaging part 14e eccentrically away from the center of the axis of the drill 14 engages the top of the stopper 40. Thereby, relative rotation of the drill 14 with respect to the drill holder 12 about the axis thereof is restricted, and the drill 14 and the drill holder 12 are rotatable together about the axis thereof. Since the stopper 40 engages with both of the engaging parts 14e respectively provided at the drills 14 while pressingly fitted in the blind hole 13 with the closed bottom, the stopper 40 does not come out from the blind hole 13 even if vibration or centrifugal force is transmitted to the stopper 40 during rotation of the drill 14.

The drill bit 10 having the above construction can be manufactured according to, for instance, the following steps:

I The engaging part 14e is formed by machining the base end of the shank 14c of the drill 14. After forming the insertion hole 11, the blind hole 13 is formed at a center of any one of the plural planes 15 of the non-circular part 16 such that the blind hole 13 intersects the insertion hole 11.

II The stopper 40 is fitted (for instance, press fitted) in the bottom of the blind hole 13. The size of the stopper 40 is set such that the head thereof protrudes inside the insertion hole 11 when inserted.

III The shank 14c is inserted into the insertion hole 11 such that the engaging part 14e engages with the stopper 40 to restrict a rotation of the drill 14 relative to the holder 12.

In the step III, the shank 14c may be fitted into the insertion hole 11 with a clearance and then fixed by brazing or its equivalent. Alternatively, the shank 14c may be close fitted into the insertion hole 11. In the latter case, the drill bit can be assembled integrally without a specific fixing means. The close fit may be performed by press fit, or shrinkage fit (heating the internal threaded part to allow it to expand, inserting the external threaded part into the heated internal threaded part, and then allowing the expanded internal threaded part to shrink for close fit) or expand fit (cooling the external threaded part to allow it to shrink, inserting the external threaded part into the internal threaded part, and then allowing the external threaded part to expand for close fit). The shrinkage fit and the expand fit may be performed within an allowed temperature range.

The entirety of the shank 14c may not necessarily be subject to a close fit in the insertion hole 11. For instance, a small gap may be defined between the shank 14c and the insertion hole 11 to press fit the engaging part 14e in the gap between the head of the stopper 40 and an inner circumference of the insertion hole 11 for fixation. In this case, an assembling operation of the drill bit as a whole is further facilitated.

Next, a drill bit holder 20 to which the drill bit 10 is mounted is described with reference to FIGS. 7 to 9B.

As shown in these drawings, the drill bit holder 20 is integrally formed with a shank 22 that is connected to a drive source for rotation (not shown) and a drill bit mount 24 to which the drill bit 10 is mounted. The drill bit mount 24 is formed with a drill housing hole 26 of a circular shape in cross section. One of the drills 14 is housed in the housing hole 26 with the centering shaft 19 fitted therein almost in a close fit state, thereby centering the drill bit 10. Namely, in this embodiment, the drill housing hole 26 functions as a fitting hole for centering.

A fitting hole 27 with a circular shape in cross section is formed in the drill bit mount 24 near an entrance of the drill housing hole 26 with such a size as to accommodate the disk parts 18 of the drill holder 12 therein almost in a close fit state. Fitting of the disk parts 18 into the fitting hole 27 also enables centering of the drill bit 10. A lock mechanism 30 to lock mounting of the drill bit 10 onto the drill bit mount 24 is provided in a perimeter of the fitting hole 27.

Figure 8A:
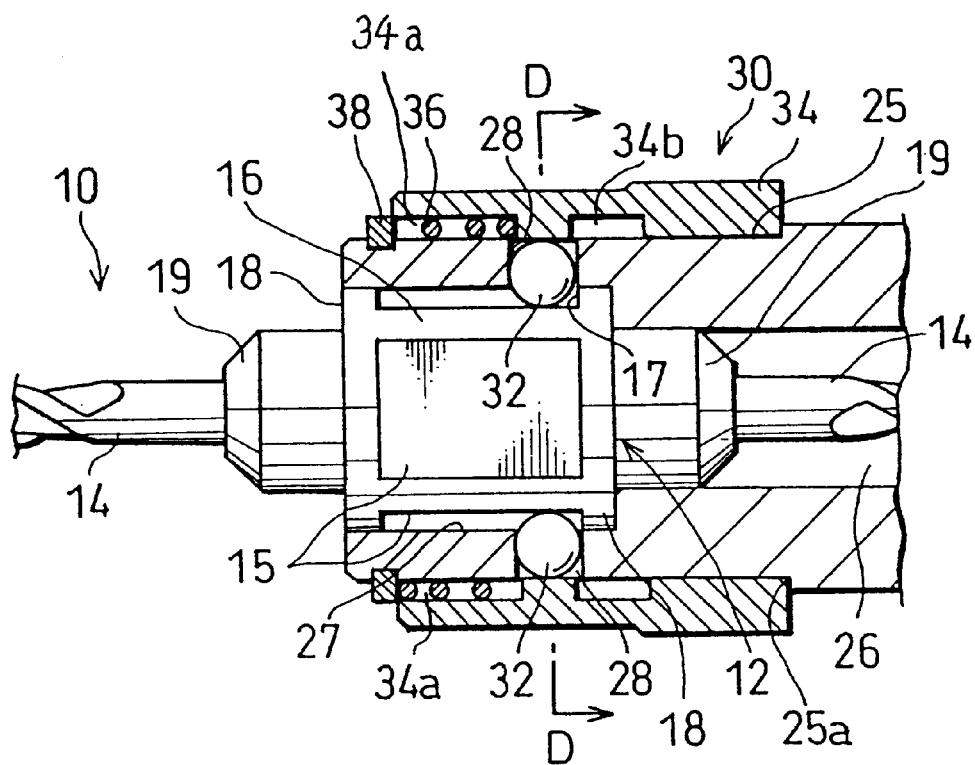
FIGS. 8A and 8B are enlarged views showing essential parts of the drill tool.
Figure 8B:
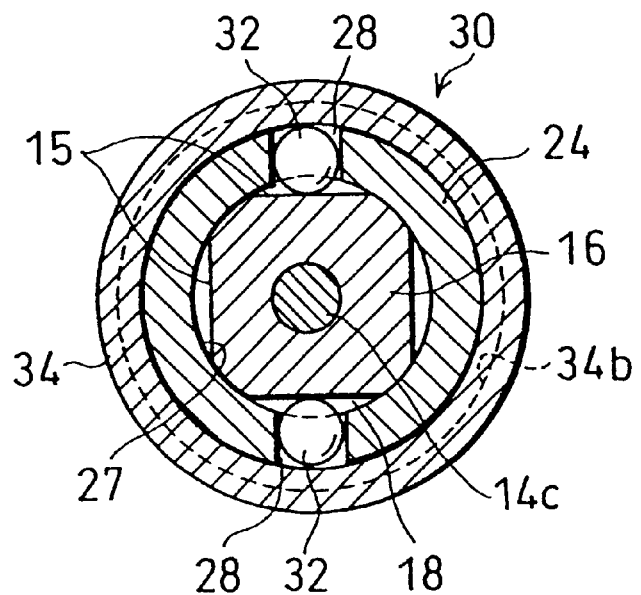
Figure 9A:
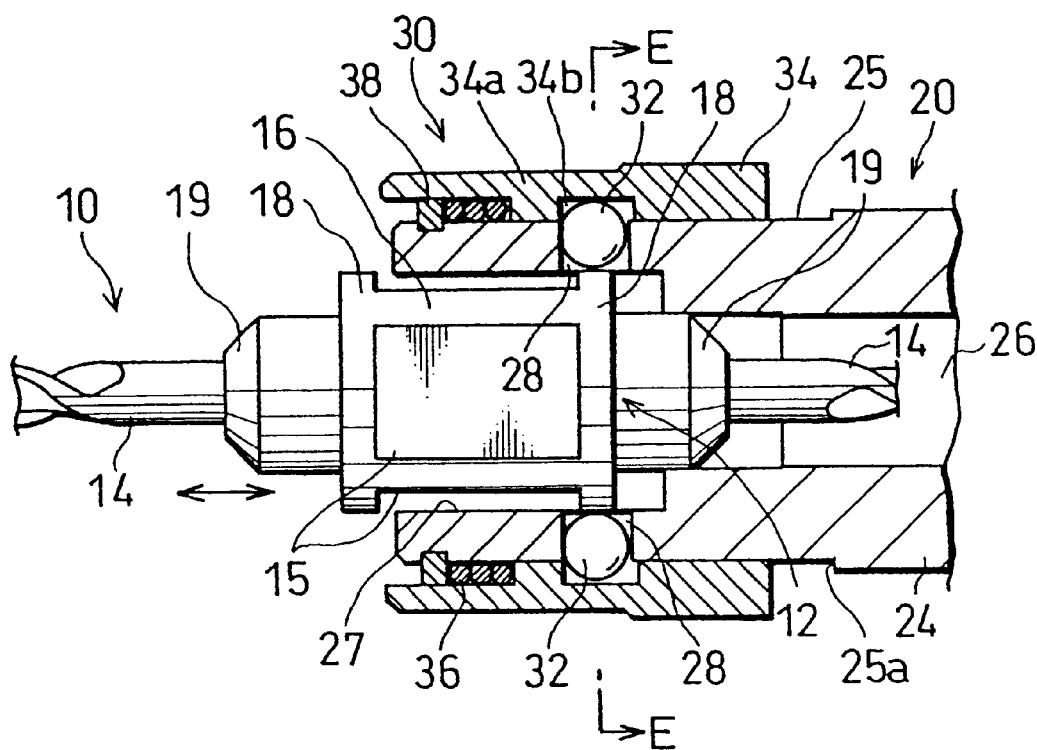
FIGS. 9A and 9B are enlarged views showing essential parts of the drill tool.
Figure 9B:
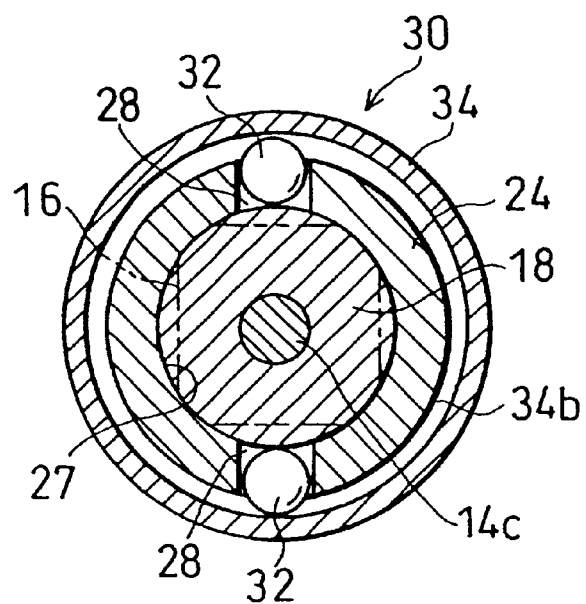

More specifically, as shown in FIGS. 8A to 9B, the lock mechanism 30 is constructed such that a plurality of through-holes (two in the drawings) 28 passing radially through a circumferential wall of the drill bit mount 24 are formed equidistantly (at 180° intervals in the drawings) in the circumferential wall encasing the fitting hole 27. A ball (engaging member) 32 is housed in each of the through-holes 28. Each of the balls 32 has a diameter larger than the thickness of the circumferential wall in which the through-hole 28 is formed. The ball 32 is movable between an engaged position where the ball 28 bulges into the fitting hole 27, as shown in FIGS. 7, 8A, and 8B, and a release position where the ball 32 retracts from the engaged position radially outward, as shown in FIGS. 9A and 9B. The arranged position of the through-hole 28 and the ball 32 is determined such that the ball 32 engages with a stepped part 17 formed between the non-circular part 16 and the rear disk part 18 when the disk parts 18 are fitted in the fitting hole 27 as shown in FIGS. 7, 8A and 8B and the ball 32 is set at the engaged position.

An outer circumference of the circumferential wall of the drill bit mount 24 is formed into a small diametrical part 25 with a diameter slightly smaller than the other outer circumference of the drill bit mount 24. A retaining sleeve (retainer) 34 is fitted over the small diametrical part 25 almost in a close fit state to be axially slidable.

A circumferential groove 34a opened toward a lead end of the drill bit mount 24 and a circumferential groove 34b formed in rearwardly spaced relation to the circumferential groove 34a (right-side in FIGS. 8A and 8B) are formed in an inner circumference of the retaining sleeve 34. A compression coil spring 36 is housed in the circumferential groove 34a, with a lead end of the retaining sleeve 34 (left end in FIGS. 8A and 9B) held by a stopper ring 38 fixed to the outer circumference of the drill bit mount 24. The retaining sleeve 34 is urged rearward by a compressive force of the coil spring 36.

In this arrangement, when an external force is not exerted, a rear end of the retaining sleeve 34 is abutted against a step 25a formed at a rear end of the small diametrical part 25 and is retained thereat. The configuration of the retaining sleeve 34 is set such that in the above retaining state, a part of the retaining sleeve 34 between the circumferential grooves 34a, 34b outwardly presses the ball 32 to set the ball 32 at the engaged position shown in FIGS. 8A and 8B. The ball 32 can also be shifted to the release position shown in FIGS. 9A and 9B where the ball 32 is moved radially outward, namely into the circumferential groove 34b when an external force is applied to the retaining sleeve 34 to move the sleeve 34 forward.

Next, an operation of the drill tool according to this invention is described.

First, as shown in FIGS. 7, 8A, and 8B, when the drill bit 10 is mounted to the drill bit holder 20, the ball 32 set at the engaged position restricts the drill bit 10 from loosening out of the drill bit holder 20 due to abutment of the ball 32 against the step part 17 formed between the non-circular part 16 and the rear disk part 18. The ball 32 also restricts rotation of the drill holder 12 in the fitting hole 27. In this arrangement, when a torque is applied to the drill bit holder 20 from the drive source, the torque is securely transmitted to the drill bit 10, thus rotating the entirety of the drill tool. This arrangement enables a desirable drilling operation with use of the drill 14 set at the lead end of the drill bit 10.

In the case where the drill 14 loses or weakens the drilling ability due to breakage or the like, the drill bit 10 is temporarily dismounted from the drill bit holder 20. Specifically, nipping the retaining sleeve 34 with fingers or the like and exerting an external force in such a way as to slide the retaining sleeve 34 axially forward against the compressive force of the coil spring 36 enables dismounting of the drill bit 10 from the drill bit holder 20. Then, the ball 32 is retracted into the circumferential groove 34b, and shifted from the engaged position to the release position. In this state, the drill bit 10 is ready to be dismounted from the drill bit holder 20.

Next, the drill bit 10 is mounted in the opposite direction opposite the previously mounted state (namely, the unused drill 14 that has been housed in the housing hole 26 of the drill bit mount 24 is directed outward at the lead end of the drill bit holder 20) while housing the broken or damaged drill 14 in the drill housing hole 26, and the centering shaft 19 and the disk parts 18 are respectively fitted in the housing hole 26 and the fitting hole 27. Thereafter, when the holding force of the retaining sleeve 34 is released, the retaining sleeve 34 is retracted to such a position as to abut the rear end thereof against the step 25a due to the compressive force of the coil spring 36, thereby setting the ball 32 at the engaged position again. When the ball 32 is set at the engaged position, mounting of the drill bit 10 onto the drill bit holder 20 is locked to the drilling operation to restart using the newly set drill 14.

When observing the construction of the drill bit 10, forming the non-circular part 16 with a substantially square shape in cross section at the intermediate part of the drill holder 12 enables preventing relative rotation of the drill 14 with respect to the drill holder 12 without providing a circumferential groove for fittingly confining a ball as a stopper, as has been performed conventionally. Also, when observing the construction of the drill bit holder 20, the drill bit holder 20 is formed with the drill housing hole 26 and the fitting hole 27 both of which have a circular shape in cross section, unlike the conventional drill bit holder formed with a polygonal hole. Thus, the drill bit holder 20 can be manufactured according to a simplified manufacturing process, which remarkably reduces the production cost of the drill tool as a whole.

Particularly, in this embodiment, the entire configuration of the drill holder 12 is formed such that the outer circumference of the intermediate part of the cylindrical member is sliced off at a plurality of positions to leave the flat planes 15 while also leaving the axially opposite ends (disk parts 18). In this arrangement, the drill holder 12 is manufactured by simply removing the plurality of parts over the circumference of the cylindrical member by machining or the like to shape the flat planes 15. Further, the drill holder 12 having the above simplified construction prevents loosening of the drill 14 from the drill holder 12 and relative rotation of the drill 14 with respect to the drill holder 12 (namely, torque transmission from the drill bit holder 20 to an drill 14 is secured) at the same location.

In addition, the disk parts 18 have the identical shape. Fitting the disk parts 18 in the fitting hole 27 having a circular shape in cross section, enables centering of the drill bit 10. In other words, since the drill holder 12 functions as a shaft member for centering the drill bit 10, in addition to the function as a holder, an accurate centering is ensured with a compact construction. Further, forming the centering shaft 19 independently of the drill holder 12, as shown in this embodiment, further ensures accurate centering.

In this invention, the specific construction of the drill bit holder 20 and the specific mounting structure of the drill bit 10 are not limited to the ones shown in the drawings and can be designed desirably according to a designer's choice.

Figure 10:
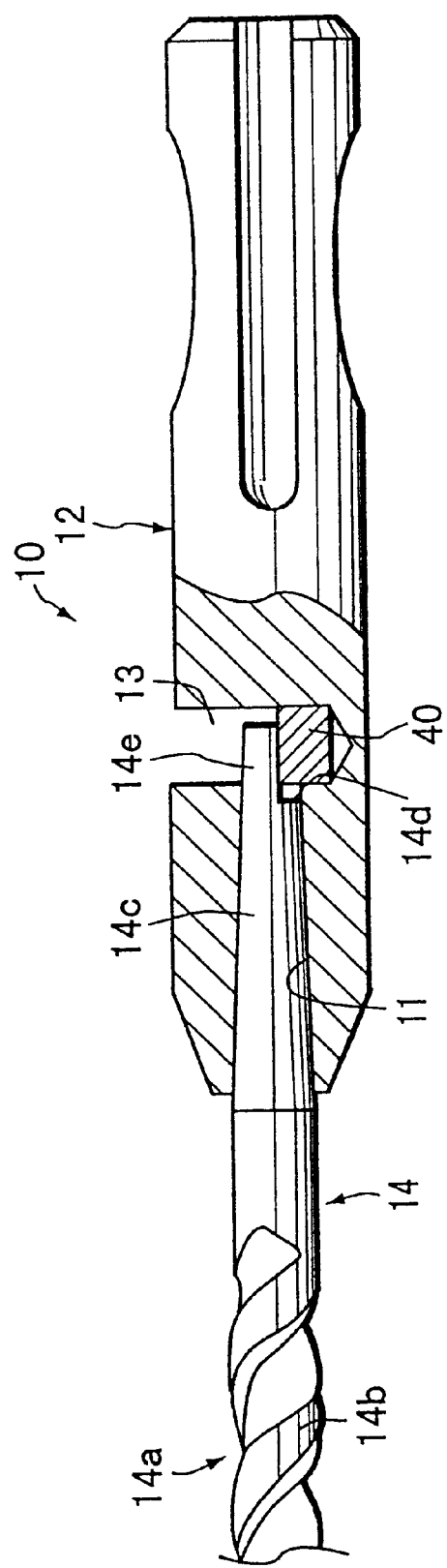
FIG. 10 is a cross sectional front view of a second embodiment of a drill bit according to this invention.

A second embodiment of this invention is described with reference to FIG. 10. In this embodiment, an insertion hole 11 is formed in one of the axially opposite ends of a drill holder 12, and a shank 14c is tapered as it approaches a base end thereof. The insertion hole 11 into which the shank 14c is fitted also has a tapered shape substantially identical to the shank 14c.

As shown in this embodiment, this invention is applicable to a drill bit 10 provided with a drill 14 at one of the axially opposite ends thereof. Further, as shown in FIG. 10, forming the tapered shank 14c facilitates a press fit of the shank 14c into the insertion hole 11. In this case, it is necessary to insert the shank 14c sufficiently deep into the insertion hole 11 to secure the press fit. Accordingly, it is desirable to set the length of the drill 14 such that a shank end 14d does not abut against a stopper 40.

In the second embodiment, other fixing means such as a shrinkage fit and an expand fit may be applicable in place of the press fit.

Next, a third embodiment of this invention is described with reference to FIGS. 11 to 13B.

Similar to the first embodiment, a drill bit 10 in this embodiment includes a drill holder 12 and a pair of drills 14 connected to the axially opposite ends thereof; respectively. The shape of the drill 14 and the outer shape of the drill holder 12 are the same as the one shown in the first embodiment, and hence description thereof is omitted herein.

Figure 11A:
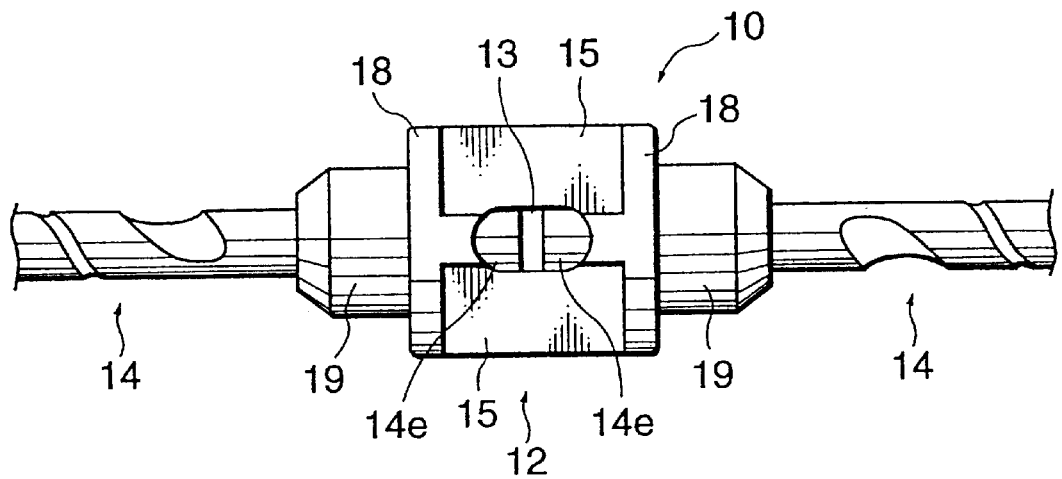
FIGS. 11A and 11B are a plan view and a cross sectional front view respectively showing essential parts of a third embodiment of a drill bit according to this invention.

The drill holder 12 is formed with a pair of insertion holes 11 extending, along an axis of rotation thereof, from a surface of the axially opposite ends toward an axially intermediate part. A blind hole 13 with a closed bottom is formed in the drill holder 12 extending from one of the corner ends of a non-circular part 16 radially inward toward the intermediate part. The blind hole 13 is formed into a substantially elliptical shape in plan view, as shown in FIG. 11A, and extends radially inward to such a degree as to intersect a bottom part of both of the insertion holes 11. The blind hole 13 extends up to a radially intermediate position (substantially depthwise center in the drawing of FIG. 11B) of the insertion holes 11. In other words, the depth of the blind hole 13 is limited to a certain level.

Figure 11B:
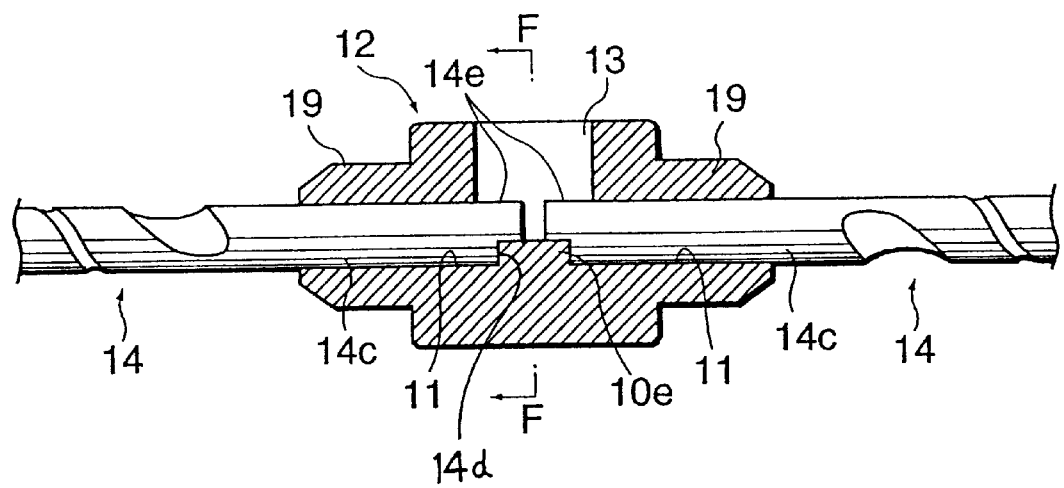
Figure 11C:
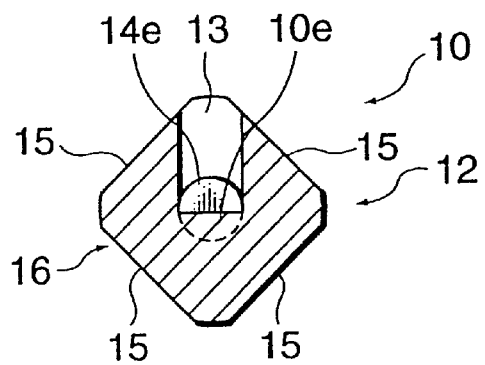
FIG. 11C is a cross section taken along the line F—F in FIG. 11B.
Figure 12:
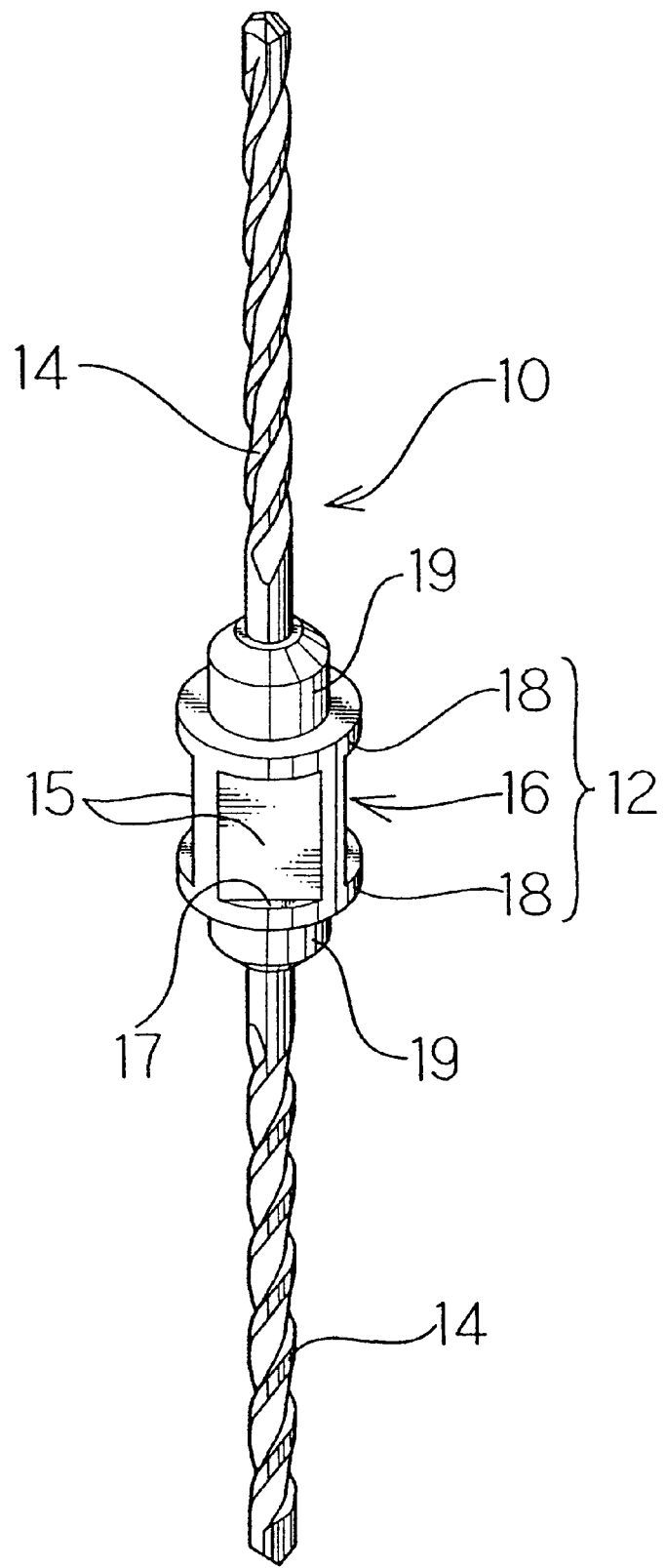
FIG. 12 is a perspective view of the third drill bit.
Figure 13A:
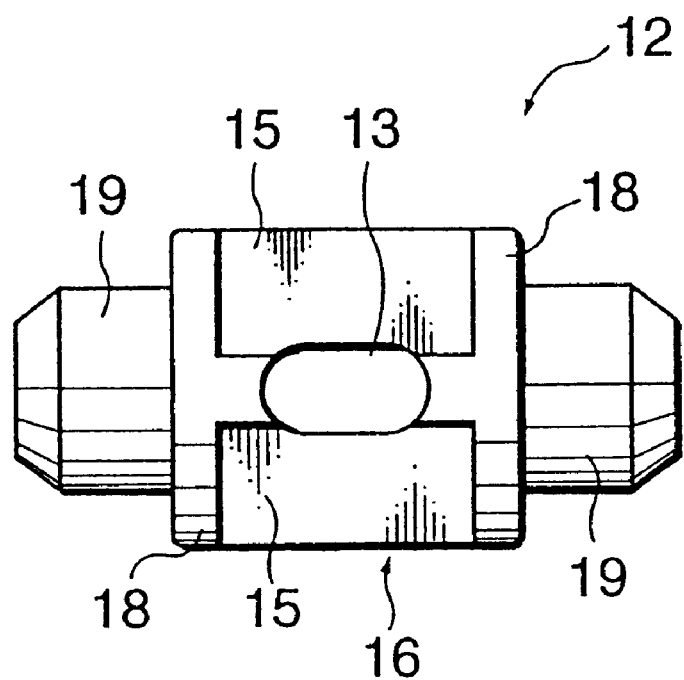
FIGS. 13A and 13B are respectively a plan view and a cross sectional front view of a drill holder in the third drill bit.
Figure 13B:
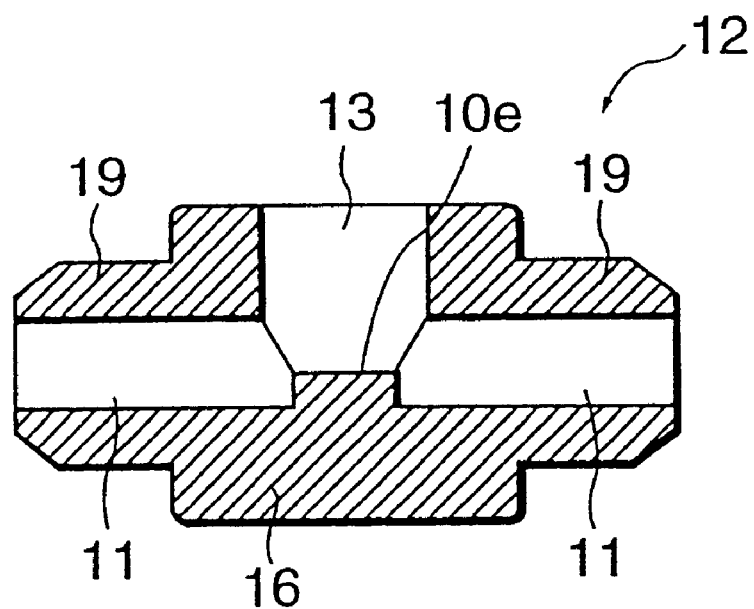

The combination of the insertion holes 11 and the blind hole 13 defines a restricting part 10e protruding from an inner circumference of the insertion holes 11 radially inward at the bottom end of the insertion holes 11 (axially intermediate position of the drill holder 12 in FIG. 11B). Fitting a shank 14c of each of the drills 14 deep into the corresponding insertion hole 11 allows a distal end 14d of the shank 14c to abut against a side surface of the restricting part 10e, while rendering an engaging part 14e of each of the drills 14 in pressing contact with a top of the restricting part 10e.

In this way, engaging the engaging part 14e eccentrically away from a center of axis the drill 14 with the restricting part 10e prevents a relative rotation of the drill 14 with respect to the drill holder 12 about an axis thereof, and it ensures rotation of the drill 14 along with the drill holder 12 about the axis thereof. Further, since the restricting part 10e is integrally formed with the drill holder 12, there is no possibility of the restricting part loosening from the drill holder 12 that could have happened in the case of the prior art drill bit provided with a stopper pin.

The drill bit 10 can be produced, for instance, according to the following steps.

The engaging part 14e is formed by machining a base end of the shank 14c of the drill 14. After forming the insertion holes 11 by digging a hole in the opposite ends of the drill holder 12 except the axially intermediate part, the blind hole 13 with a closed bottom is formed such that the blind hole 13 extends from one of the corner ends of the non-circular part (boundary part between the adjacent planes 15) radially inward toward the insertion holes 11 to such a degree as to intersect the insertion holes 11 halfway through. Thereby, the restricting part 10e is bridgingly formed between the insertion holes 11. The insertion holes 11 may be formed after forming the blind hole 13.

Next, fitting the shank 14c into the insertion hole 11 engages the engaging part 14e with the restricting part 10e. Thus, relative rotation of the drill 10 with respect to the drill holder 12 is easily prevented.

In this embodiment, the shank 14c may be subject to a clearance fit into the insertion hole 11 and fixed by brazing or the like. Alternatively, the shank 14c may be fitted into the insertion hole 11 by a close fit such as a press fit and a shrinkage fit. As an altered arrangement, fixation can be accomplished by securing a small clearance between the shank 14c and the insertion hole 11 and press fitting the engaging part 14e in the clearance between a head of the restricting part 10e and an inner circumference of the insertion hole 11.

Figure 14:
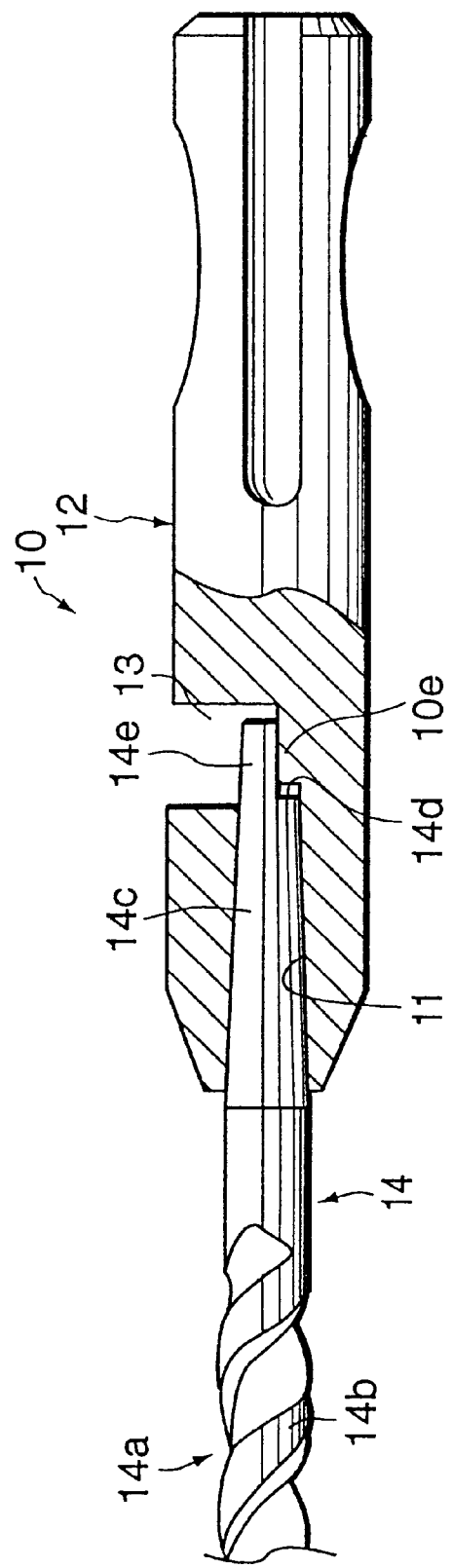
FIG. 14 is a cross sectional front view showing essential parts of a fourth embodiment of a drill bit according to this invention.

A fourth embodiment according to this invention is described with reference to FIG. 14. In this embodiment, an insertion hole 11 is formed in one of the axially opposite ends of a drill holder 12. A shank 14c is tapered as it approaches a base end thereof. The insertion hole 11 into which the shank 14c is fitted also has a tapered shape substantially identical to the shank 14c.

In the above drill bit 10 formed with one drill 14, forming a blind hole 13 that intersects a bottom of the insertion hole 11 securely prevents relative rotation of the drill 14 with respect to the drill holder 12 by integrally forming a restricting part 10e with the drill holder 12. Further, shaping the shank 14c into a tapered form as shown in FIG. 14 facilitates a press fit of the shank 14c into the insertion hole 11. In this case, it is necessary to insert the shank 14c sufficiently deep into the insertion hole 11 to secure the press fit. Accordingly, it is desirable to set the length of the drill 14 such that a shank end 14d does not abut against the restricting part 10e.

In the fourth embodiment, that other fixing means such as a shrinkage fit and an expand fit may be applicable in place of the press fit.

The present invention can take the following modifications and alterations.

(1) In the first and second embodiments, the specific construction and protruded amount of the head (top) of the stopper 40 are desirably set according to designer's choice. As a best mode, however, shaping the stopper 40 such that the top surface thereof is flat and passes or aligns in spaced relation to a center axis of the insertion hole 11, as shown in FIG. 5, simplifies the shape of the stopper 40 and the engaging part 14e that engages the stopper 40. Also, this arrangement ensures a sufficient engagement. Note that the head of the stopper 40, which should be flat in the best mode, hardly deforms even after hammering down the stopper 40 into the blind hole 13, and hence, press fit operation of the stopper 40 by a hammer or the like is surely performed.

(2) In this invention, it is possible to fit the shank 14c into the insertion hole 11 according to a clearance fit and then fix the shank 14c thereat by brazing or the like. In this case, solely depending on the brazing as performed conventionally may not withstand a large torque applied to the fixed part. In this invention, however, engagement of the stopper 40 (restricting part 10e) with the engaging part 14e assures prevention of relative rotation of the drill with respect to the drill holder (namely, it withstands the large torque).

(3) In the first and the second embodiments, shaping the distal end 14d of the shank 14c into a circular arc to allow a planar contact with the circumference of the stopper 40 increases a contact area of the distal end 14d of the shank 14c with the circumference of the stopper 40. Thereby, the mounted state of the drill 14 on the drill holder 12 is more securely stabilized.

(4) In the third and fourth embodiments, the specific construction and protruded amount of the restricting part 10*e* are desirably set according to designer's choice. As a best mode, however, shaping the restricting part 10*e* such that the top surface thereof is flat and passes or aligns in spaced relation to a center of axis the insertion hole 11, as shown in FIG. 11B, simplifies the shape of the restricting part 10*e* and the engaging part 14*e* that engages the restricting part 10*e*. Also, this arrangement ensures a sufficient engagement. The diameter and shape of the blind hole 13 may be set desirably in accordance with the shape of the restricting part 10*e*.

(5) In this invention, the shape of the drill holder 12 is not limited to the one in the above embodiments. For instance, the shape disclosed in Japanese Examined Patent Publication No. 8-18213/1996 may be used.

(6) In the case where a pair of drills 14 are provided at the opposite ends of the drill bit 10, the shape of the drills 14 may not necessarily be identical to each other. For instance, the diameter of the bit of one of the drills 14 may be varied from that of the other drill 14.

(7) The centering shaft 19 of the drill bit 10 can be omitted as needed. In the case where the centering shaft 19 is provided, although, in the foregoing embodiment, the drill housing hole 26 of the drill bit holder 20 into which the drill 14 is accommodated is used as a fitting hole for centering as well as housing, a fitting hole for centering may be provided independently from the drill housing hole 26.

(8) The shape of the drill bit holder 20 is not limited to the one shown in the foregoing embodiments. For instance, an inner end of the engaging member (end part that abuts against the drill bit 10) may be shaped into a spherical form, whereas the other part thereof that is to be housed in the through-hole 28 may be shaped into a column. Also, the shape of the retainer is not limited to the one shown in the aforementioned embodiments. For instance, the retainer may be of an annular spring that holds the engaging member at the engaged position from outward.

Figure 15A:
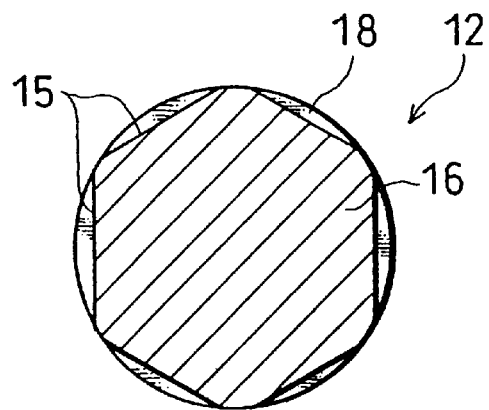
FIGS. 15A to 15C are cross sectional side views each showing a modification of a transverse cross section of a non-circular part in the aforementioned drill bit.
Figure 15B:
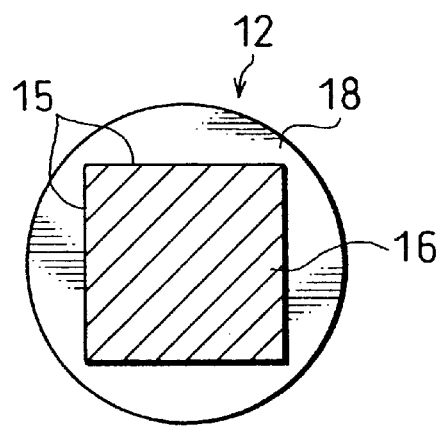
Figure 15C:
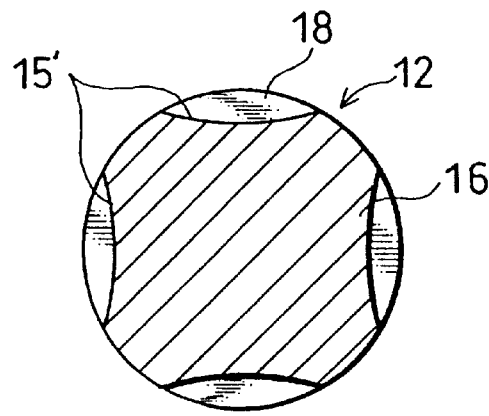
Figure 16A:
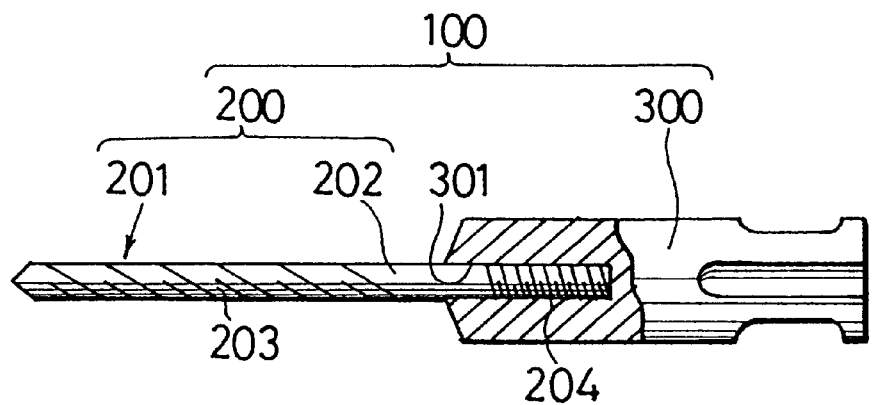
FIGS. 16A to 16C are cross sectional diagrams each illustrating a drill bit of prior art.
Figure 16B:
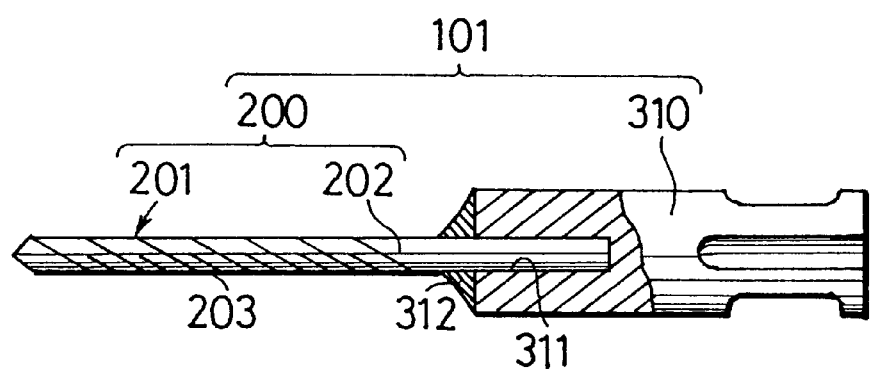
Figure 16C:
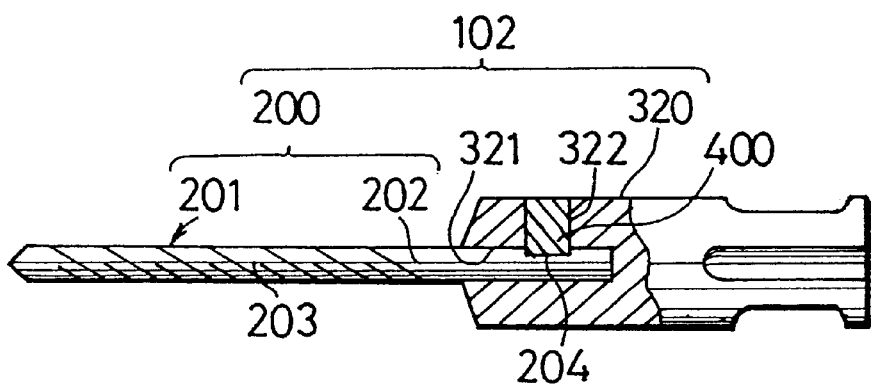

(9) The cross sectional shape of the non-circular part 16 is not limited to a substantially square shape. For instance, a substantially hexagonal shape shown in FIG. 15A or other polygonal shape may be applicable. Further, although a shaping (removal) amount increases, the non-circular part 16 may be shaped into a complete polygon (e.g., square in FIG. 15B) whose size is obviously smaller than the diameter of the disk part 18. Alternatively, at least a part of the flat plane 15 may be curved into a recess 15', as shown in FIG. 15C. As a best mode, however, a square or a substantially square shaped part may be more preferable for easy machining and considering the fact that the more the number of apexes of the polygon increases, the more the torque transmission weakens (namely, the smaller number of apexes of the polygon is better).

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. A drill bit comprising:
   a drill including a bit and a shank; and
   a drill holder formed with an axial insertion hole to fit the shank,
      the shank formed with an engaging part,
      the drill holder formed with a blind hole extending from an outer circumference thereof in such a way as to intersect the insertion hole, and
      a stopper which is inserted in the bottom of the hole, thereby a top of the stopper engages the engaging part to restrict a relative rotation of the drill to the drill holder.

2. The drill bit as recited in claim 1, wherein the engaging part has a planar surface that is engageable with the top of the stopper.

3. The drill bit as recited in claim 1, wherein the shape of the engaging part is so formed as to cover at least a part of the top of the stopper from the opposite side of the bottom of the blind hole.

4. The drill bit as recited in claim 3, wherein a surface of the top of the stopper is shaped into a flat plane that extends substantially along a center axis of the insertion hole.

5. The drill bit as recited in claim 1, wherein the engaging part is press fitted on the top of the stopper in the insertion hole.

6. The drill bit as recited in claim 1, wherein the shank is fitted into the insertion hole to such a degree as to axially abut the engaging part against the top of the stopper.

7. The drill bit as recited in claim 6, wherein a base end of the shank is so formed as to axially come into planar contact with the top of the stopper.

8. The drill bit as recited in claim 1, wherein a diameter of the blind hole and the stopper is set equal to or larger than a diameter of the insertion hole.

9. The drill bit as recited in claim 1, wherein the stopper is press fitted in the bottom of the blind hole.

10. The drill bit as recited in claim 1, wherein the insertion hole is formed in one of axially opposite ends of the drill holder.

11. The drill bit as recited in claim 1, wherein the insertion hole is formed in axially opposite ends of the drill holder, and the engaging part of the shank to be inserted into each of the insertion holes commonly engages the top of the stopper.

12. The drill bit as recited in claim 11, wherein axially opposite ends of the drill holder are each shaped into a disk part identical to each other with a diameter larger than the drill, and an intermediate part of the drill holder between the disk parts is formed into a non-circular part such that a cross section thereof is a polygon or a substantial polygon with a diameter of a circumscribed circle thereof equal to or smaller than the diameter of the disk part.

13. The drill bit as recited in claim 12, wherein the non-circular part has a flat surface.

14. The drill bit as recited in claim 12, wherein the non-circular part has a substantially square shape in cross section.

15. The drill bit as recited in claim 12, wherein a cylindrical centering shaft with a diameter larger than the drill and smaller than the disk part is formed between each of the disk parts and the corresponding drill.

16. A drill bit comprising:
   a drill including a bit and a shank; and
   a drill holder formed with an insertion hole to fit the shank,
      the drill holder formed with a blind hole extending radially halfway through the insertion hole in such a way as to intersect a bottom end of the insertion hole to thereby form a restricting part at the bottom end of the insertion hole,
      the shank formed with an engaging part at an end thereof to engage the restricting part, whereby an engagement of the restricting part and the engaging part restricts a relative rotation of the drill to the drill holder.

17. The drill bit as recited in claim 16, wherein the engaging part has a planar surface that is engageable with the restricting part.

18. The drill bit as recited in claim 16, wherein the shank is fitted into the insertion hole to such a degree as to axially abut the engaging part against the top of the restricting part.

19. The drill bit as recited in claim 16, wherein the insertion hole is formed in one of axially opposite ends of the drill holder.

20. The drill bit as recited in claim 16, wherein the insertion hole is formed in axially opposite ends of the drill holder to fit the shank of the corresponding drill therein.

21. The drill bit as recited in claim 20, wherein the blind hole is so formed as to commonly intersect respective bottom ends of the insertion holes to thereby form a restricting part bridgingly covering the insertion holes.

22. The drill bit as recited in claim 16, wherein axially opposite ends of the drill holder are each shaped into a disk part identical to each other with a diameter larger than the drill, and an intermediate part of the drill holder between the disk parts is formed into a non-circular part such that a cross section thereof is a polygon or a substantial polygon with a diameter of a circumscribed circle thereof equal to or smaller than the diameter of the disk part.

23. The drill bit as recited in claim 22, wherein the non-circular part is formed by slicing off an intermediate part, from a cylinder, at plural positions over a circumference of the cylinder in such a way as to leave a flat plane corresponding to the removed part while leaving the axially opposite ends corresponding to the disk parts having a diameter larger than the bit of the drill.

24. The drill bit as recited in claim 22, wherein the non-circular part has a substantially square shape in cross section.

25. The drill bit as recited in claim 22, wherein a cylindrical centering shaft with a diameter larger than the drill and smaller than the disk part is formed between each of the disk parts and the drill.

26. A drill tool comprising:
(a) a drill bit including:
(a1) a drill having a bit and a shank; and
(a2) a drill holder formed with an axial insertion hole to fit the shank, the shank formed with an engaging part, the drill holder formed with a blind hole extending from an outer circumference thereof in such a way as to intersect the insertion hole, and
(a3) a stopper which is inserted in the bottom of the hole, thereby a top of the stopper engages the engaging part to restrict a relative rotation of the drill to the drill holder; and
(b) a drill bit holder formed with a housing hole to concentrically house the drill bit therein.

27. A drill tool comprising:
(a) a drill bit including:
(a1) a drill having a bit and a shank; and
(a2) a drill holder formed with an axial insertion hole to fit the shank, the shank formed with an engaging part, the drill holder formed with a blind hole extending from an outer circumference thereof in such a way as to intersect the insertion hole, and
(a3) a stopper which is inserted in the bottom of the blind hole, thereby a top of the stopper engages the engaging part to restrict a relative rotation of the drill to the drill holder,
wherein the insertion hole is formed in axially opposite ends of the drill holder, and the engaging part of the shank to be inserted into each of the insertion holes commonly engages the top of the stopper;
wherein axially opposite ends of the drill holder are each shaped into a disk part identical to each other with a diameter larger than the drill, and an intermediate part of the drill holder between the disk parts is formed into a non-circular part such that a cross section thereof is a polygon or a substantial polygon with a diameter of a circumscribed circle thereof equal to or smaller than the diameter of the disk part; and
(b) a drill bit holder formed with a circular drill housing hole to house one of the drills of the drill bit and a fitting hole of a circular shape in cross section to fit the disk parts of the drill holder,
the drill bit holder provided, at a circumferential wall thereof encasing the fitting hole, an engaging member movable between an engaged position where the engaging member engages a step part formed between the rear disk part and the non-circular part to prevent loosening off of the drill bit and a relative rotation of the drill to the drill holder and a release position where the engaging member is retracted from the engaged position radially outward to allow a disengagement of the drill bit, and a retainer operable to change the position of the engaging member between the engaged position and the release position.

28. The drill tool as recited in claim 27, wherein a cylindrical centering shaft with a diameter larger than the drill and smaller than the disk part is provided between each of the drills and the corresponding disk part, and the drill bit holder is formed with the fitting hole for centering the drill bit as the centering shaft is fitted therein.

29. A drill tool comprising:
(a) a drill bit including:
(a1) a drill having a bit and a shank; and
(a2) a drill holder formed with an insertion hole to fit the shank,
the drill holder formed with a blind hole extending radially halfway through the insertion hole in such a way as to intersect a bottom end of the insertion hole to thereby form a restricting part at the bottom end of the insertion hole,
the shank formed with an engaging part at an end thereof to engage the restricting part, whereby an engagement of the restricting part and the engaging part restricts a relative rotation of the drill to the drill holder; and
(b) a drill bit holder formed with a housing hole to concentrically house the drill bit therein.

30. A drill tool comprising:
(a) a drill bit including:
(a1) a drill having a bit and a shank; and
(a2) a drill holder formed with an insertion hole to fit the shank,
the drill holder formed with a blind hole extending radially halfway through the insertion hole in such a way as to intersect a bottom end of the insertion hole to thereby form a restricting part at the bottom end of the insertion hole,
the shank formed with an engaging part at an end thereof to engage the restricting part, whereby an engagement of the restricting part and the engaging part restricts a relative rotation of the drill to the drill holder;
wherein axially opposite ends of the drill holder are each shaped into a disk part identical to each other with a diameter larger than the drill, and an intermediate part of the drill holder between the disk parts is formed into a non-circular part such that a cross section thereof is a polygon or a substantial polygon with a diameter of a circumscribed circle thereof equal to or smaller than the diameter of the disk part; and (b) a drill bit holder formed with a circular drill housing hole to house one of the drills of the drill bit and a fitting hole of a circular shape in cross section to fit the disk parts of the drill holder, the drill bit holder provided, at a circumferential wall thereof encasing the fitting hole, an engaging member movable between an engaged position where the engaging member engages a step part formed between the rear disk part and the non-circular part to prevent loosening off of the drill bit and a relative rotation of the drill to the drill holder and a release position where the engaging member is retracted from the engaged position radially outward to allow a disengagement of the drill bit, and a retainer operable to change the position of the engaging member between the engaged position and the release position.

31. The drill tool as recited in claim 30, wherein a cylindrical centering shaft with a diameter larger than the drill and smaller than the disk part is provided between each of the drills and the corresponding disk part, and the drill bit holder is formed with the fitting hole for centering the drill bit as the centering shaft is fitted therein.

* * * * *